United States Patent
Malone

(10) Patent No.: US 10,250,900 B2
(45) Date of Patent: *Apr. 2, 2019

(54) SYSTEMS AND METHODS FOR EMBEDDING METADATA INTO VIDEO CONTENTS

(71) Applicant: Disney Enterprises, Inc., Burbank, CA (US)

(72) Inventor: James A. Malone, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,902

(22) Filed: Oct. 24, 2018

(65) Prior Publication Data

US 2019/0068987 A1    Feb. 28, 2019

Related U.S. Application Data

(63) Continuation of application No. 14/623,438, filed on Feb. 16, 2015, now Pat. No. 10,154,275.

(51) Int. Cl.
*H04N 19/46*    (2014.01)

(52) U.S. Cl.
CPC ................................ *H04N 19/46* (2014.11)

(58) Field of Classification Search
None
See application file for complete search history.

(56) References Cited

U.S. PATENT DOCUMENTS

| | | | |
|---|---|---|---|
| 2008/0178246 A1* | 7/2008 | Blanchard | H04N 7/0122 725/131 |
| 2009/0323125 A1* | 12/2009 | Kawakami | G06T 1/0028 358/3.28 |
| 2016/0210717 A1* | 7/2016 | Adsumilli | G06T 1/0028 |

\* cited by examiner

*Primary Examiner* — William C Vaughn, Jr.
*Assistant Examiner* — Joseph Daniel A Towe
(74) *Attorney, Agent, or Firm* — Farjami & Farjami LLP

(57) ABSTRACT

There is provided systems and methods for embedding data into a video content. A system includes an encoder, a memory storing the encoder, and a hardware processor configured to execute the encoder from the memory. The hardware processor is configured to execute the encoder from the memory to obtain the data, determine a plurality of pixels in the video content, and embed the data into the video content by inverting the plurality of pixels in the video content according to the data. The system further includes a decoder for decoding the video content to obtain the data.

20 Claims, 7 Drawing Sheets

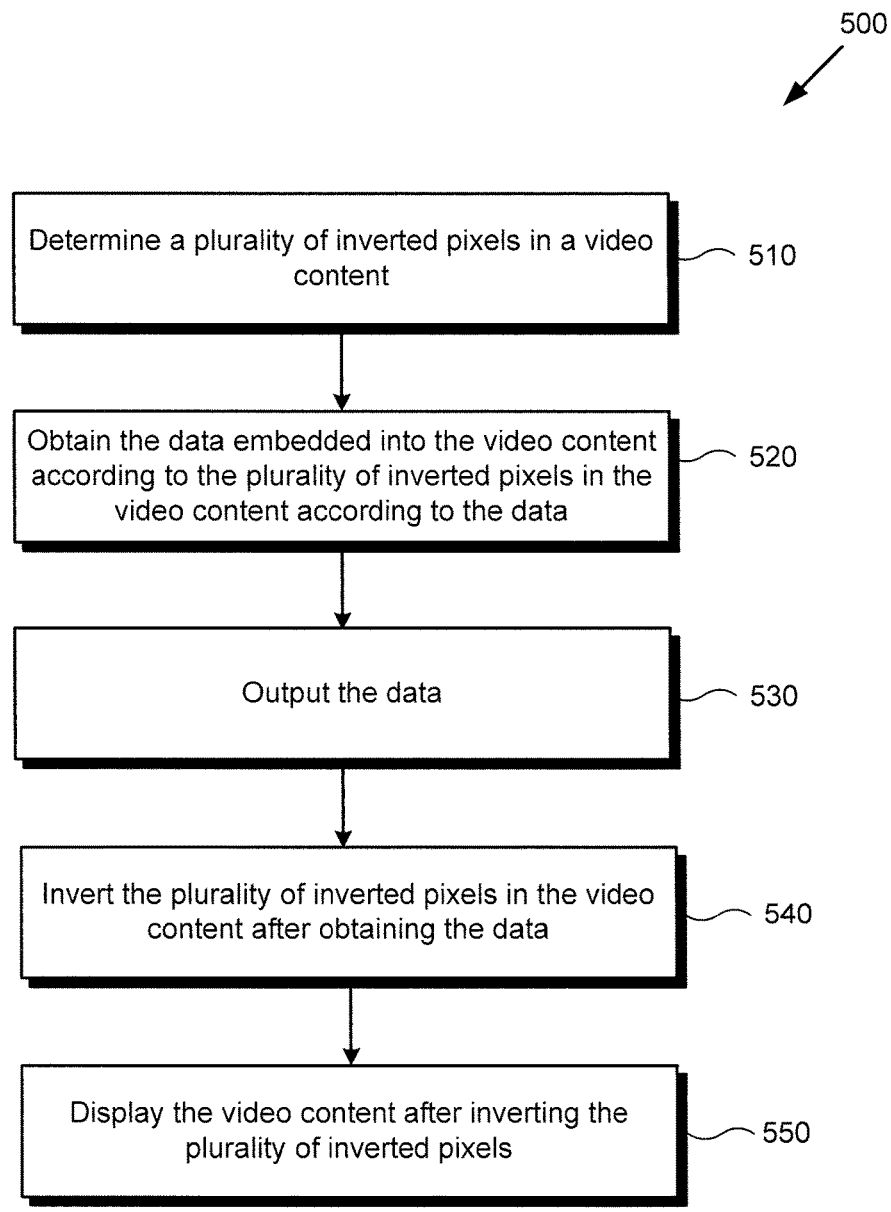

SYSTEMS AND METHODS FOR EMBEDDING METADATA INTO VIDEO CONTENTS

The present application is a Continuation of U.S. application Ser. No. 14/623,438, filed Feb. 16, 2015, which is hereby incorporated by reference in its entirety into the present application.

BACKGROUND

Conventionally, when a video content is being streamed to a device, the device needs information in addition to the video content for identifying the video content. For example, conventionally, the device relies on metadata accompanying and separate from the video content to identify the video content. However, the metadata may not be reliable information due to alterations during format conversion, error during creation of the metadata, lack of metadata, or unintelligible metadata format. Even more, especially with recorded or duplicated video content, the metadata associated with the video content is stripped and not accompany the video content being streamed to the device. As a result, the device cannot make the viewer aware of the identity of the video content, and the device will be incapable of labeling, indexing, and managing the video content effectively.

SUMMARY

The present disclosure is directed to systems and methods for embedding metadata into video contents, substantially as shown in and/or described in connection with at least one of the figures, as set forth more completely in the claims.

BRIEF DESCRIPTION OF THE DRAWINGS

FIG. 5 shows a flowchart illustrating a method for retrieving metadata from video contents, according to one implementation of the present disclosure.

DETAILED DESCRIPTION

Figure 1:
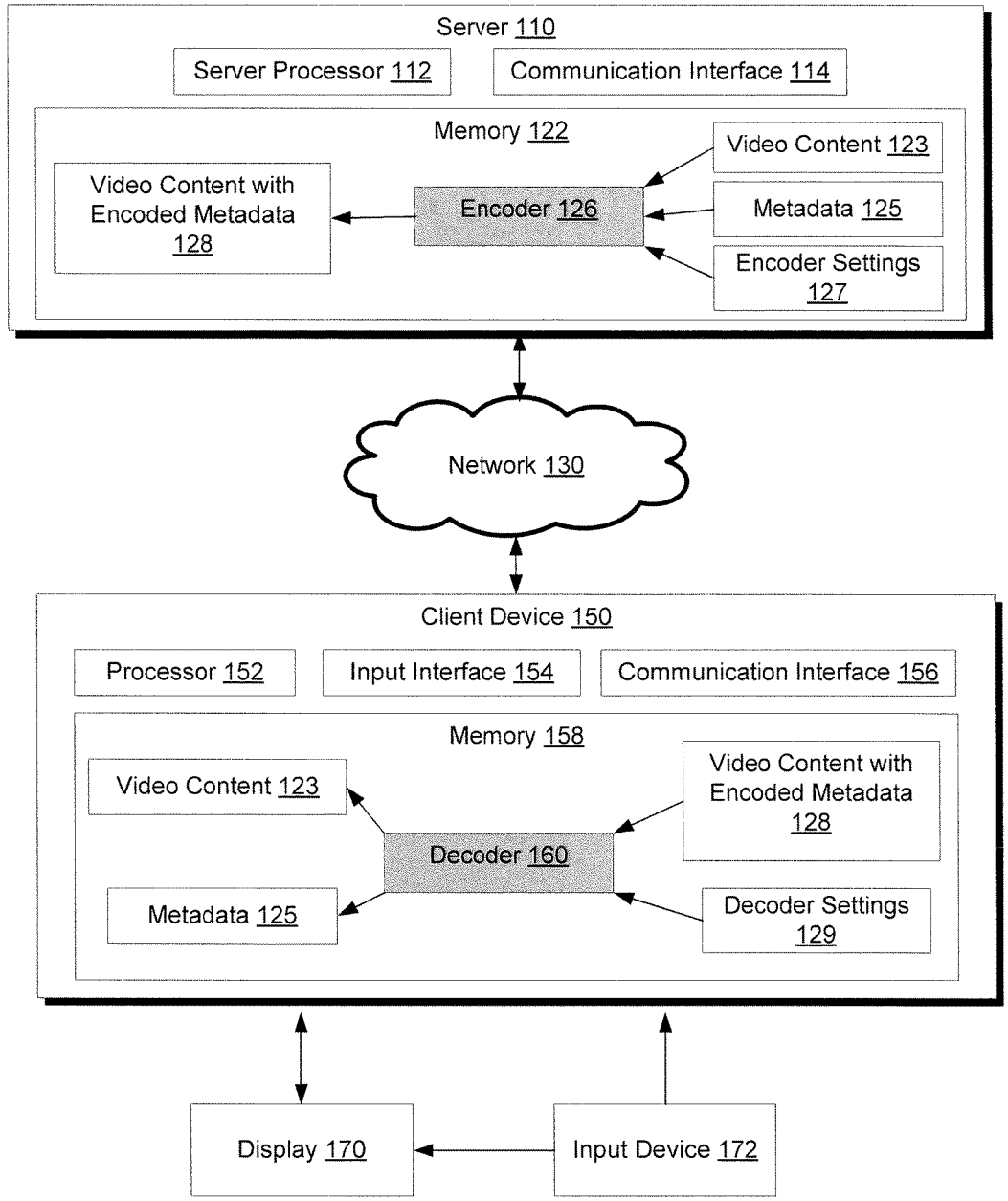
FIG. 1 presents a system for embedding metadata into video contents, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for embedding metadata into video contents, according to one implementation of the present disclosure. System 100 of FIG. 1 includes server 110, network 130, client device 150, display 170, and input device 172. Server 110 includes server processor 112, communication interface 114, and memory 122. Memory 122 includes encoder 126, video content 123, and metadata 125. Encoder 126 is an algorithm for execution by server processor 112 to encode metadata 125 into video content 123 according to encoder settings 127 for generating video content with encoded metadata 128. Client device 150 includes processor 152, input interface 154, communication interface 156, and memory 158. Memory 158 includes decoder 160, which is an algorithm for execution by processor 152 to decode video content with encoded metadata 128 using decoder settings 129 to obtain metadata 125.

Server 110 is configured to communicate with client device 150 across network 130 to provide video content with encoded metadata 128 to client device 150. Server 110 may be configured to stream video content with encoded metadata 128 to client device 150 over network 130, such as the Internet, or in some implementations, server 110 may be configured to transmit all, or part, of video content with encoded metadata 128 to client device 150 for storage on memory 158 of client device 150. For example, server 110 may be operated by a content provider. In some implementations, server 110 may be a local server, where network 130 is a local area network (LAN) and video content with encoded metadata 128 may be streamed or played locally across network 130.

Also illustrated in FIG. 1, server 110 includes server processor 112 and memory 122. Server processor 112 may be configured to access memory 122 to store received input or to execute commands, processes, or programs stored in memory 122. Server processor 112 may correspond to a processing device, such as a microprocessor or similar hardware processing device, or a plurality of hardware devices. Memory 122 is capable of storing commands, processes, and programs, such as encoder 126, for execution by server processor 112. Memory 122 may be instituted as ROM, RAM, flash memory, or any sufficient memory capable of storing a set of commands and data, such as encoder settings 127 and metadata 125. In other implementations, memory 122 may correspond to a plurality memory types or modules.

Also shown in FIG. 1, server 110 also includes communication interface 114. Server 110 may utilize communication interface 114 to communicate with communication interface 156 of client device 150 over network 130. Communication interface 114 can utilize, as examples, one or more of Ethernet, Wireless Fidelity (Wi-Fi), Worldwide Interoperability for Microwave Access (WiMax), ZigBee, Bluetooth, RFID, Algorithm Division Multiple Access (CDMA), Evolution-Data Optimized (EV-DO), Global System for Mobile Communications (GSM), Long Term Evolution (LTE), and other types of wired and wireless interfaces.

Memory 122 includes video content 123. Video content 123 includes video and may also include audio, text, still frame, photographic, and/or other types of content that include pixels. For example, content 124 may be a television show, a movie, a live broadcast, a photo album, an individual photo, or another type of visual content. Content 124 is the content in its original form, prior to being encoded by encoder 126. Content 124 may take a wide variety of formats, such as, for example, Flash, MPEG-1, MPEG-2, QuickTime, Windows Media Video, RealMedia, or WebM. It should be noted that in some implementations, video content 123 may be replaced with any type of content that includes pixels, such as any still images or photographs. Therefore, the present application is not limited to video contents and is also applicable to still images, and metadata 125 may describe the still image.

as shown in FIG. 1, memory 122 also includes metadata 125, which may be data that describes the video content or is associated with video content 123. For example, metadata 125 may include a title, a genre, a cast list, a tribune (TMS) ID, an air date, a capture date, an episode name, an episode number, and/or other data associated with video content 123. In another example, metadata 125 may include authenticity data configured for output to a viewer to inform the viewer that video content 123 is valid and/or legal.

Metadata 125 may also be personalized data generated by a user for presenting with video content 123. In such an example, metadata 125 may include a greeting for a user of client device 150, or another personalized communication. As such, metadata 125 can be any data capable of being embedded into video content 123 using encoder 126.

In some implementations, metadata 125 may include advertising information that can be dynamically embedded into video content 123 using encoder 126 for streaming of video content with encoded metadata 128 to client device 150. In such an implementation, metadata 125 may include a uniform resource locator (URL), an image, and/or other advertising data that can be embedded into video content 123. As such, once video content with encoded metadata 128 is transmitted to client device 150, client device 150 can dynamically display the advertising content to the user of client device 150 through display 170.

Encoder 126 is configured to encode metadata 125 into video content 123 to create video content with encoded metadata 128. Encoder 126 may be configured to embed or encode all of metadata 125 into video content 124, or only certain data of metadata 125. Encoder 126 is configured to determine how much of metadata 125 is to be embedded or encoded into video content 123, and then determine how many frames of video content 123 are required to embed metadata 125 into video content 123.

In one implementation, encoder 126 encodes or embeds metadata 125 into video content 123 by inverting pixels in a selected region of a frame of video content 123. For example, metadata 125 is coded with a binary representation of 0's and 1's by inverting pixels in a selected region of a frame of video content 123. In some implementations, depending on encoder settings 127, inverted pixels are represented with 0's, and non-inverted pixels are represented with 1's. However, in other implementations, depending on encoder settings 127, the non-inverted pixels may be represented with 0's, and the inverted pixels in may be represented with 1's. As such, metadata 125 is embedded or encoded into a selected region of a selected frame of video content 123.

In one implementation, encoder 126 selects a region in a frame of video content 123, such that the selected region has pixels with substantially similar color, e.g. a dark color, or a light color, such as black or white, respectively. In an example implementation, the selected region may be defined by a matrix of pixels, e.g., 10×10, 20×20, 10×20, etc. Pixels within the selected region are then altered to insert metadata 125 into the selected region of video content 213.

In one implementation, encoder 126 may also determine that the length of metadata 125, which is to be embedded into content 123 requires to be embedded in a plurality of frames of video content 123. As such, encoder 126 may scan each frame of video content 124 to determine which frames of video content 124 are suited for embedding metadata 125. In order to make the determination, in one implementation, encoder 126 may scan the frames of video content 123 for regions within each frame that include pixels of substantially identical color.

In one implementation, encoder 126 may embed metadata 125 into video content 124 using identical sized matrices of pixels, and/or may use different sized matrices of pixels for each frame. For example, encoder 126 may embed metadata 125 using 10×10, 20×20, 30×30, 200×200, 10×20, 20×30, or other any sized matrices. Encoder 126 may be configured to utilize the size of the matrices to aid in making the above described determination of which frames of video content 123 are suited for embedding metadata 125. For example, if encoder 126 determines that a matrix of metadata 125 is to be 10×10 pixels, encoder 126 may search for frames with regions that include at least a 10×10 matrix of pixels of substantially the same color to ensure that the 10×10 matrix of embedded metadata 118a fits within the region.

Once the frame or frames of video content 123 are determined by encoder 126, encoder 126 is configured to embed metadata 125 into video content 123. In order to embed metadata 125 into content 123, encoder 126 is configured to invert the pixels of the selected matrix or matrices according to metadata 125.

In some implementations, the matrices of the embedded metadata 125 are in the same location of each selected frame. For example, a 10×10 matrix may be embedded at a certain position within a first frame, and the same 10×10 matrix location may be selected for one or more other frames that are encoded using embedded metadata 125. However, in other implementations, the matrices of embedded metadata 118b may be in different locations in each frame. For example, a first 10×10 matrix may be embedded in a top right corner region of a first frame, and a second 10×10 matrix may be embedded in the bottom left corner region of a second frame.

In some implementations, the matrices may be fenced, meaning that each of the corners of the matrices may include a "1" where the "1" is embedded as an inverted or a non-inverted pixel depending on encoder settings 127. For example, if metadata 125 is embedded using a 10×10 matrix, then a "1" may be embedded at positions (from top left to bottom right) 0:0, 10:0, 0:10, and 10:10 in order to form a fence at the four corners of the matrix. Such an implementation enables decoder 160 and/or client device 150 to recognize embedded metadata 125 within video content with encoded metadata 128.

Encoder settings 127 may include the allowable sizes of matrices for embedding metadata 125, the allowable number of frames in video content 123 for encoding metadata 125, the binary code distinctions for the inverted and non-inverted pixels, instructions for determining one or more regions within frames of content 123 that include pixels of substantially similar color, and the color of regions that may be selected. Encoder settings 127 may differ for different video contents depending on the format of video content 123. In some implementations, server 110 may also communicate encoder settings 127 to client device 150 for use as part of decoder settings 129. In such an implementation, decoder 160 is configured to utilize encoder settings 128 as part of decoder settings 129 in order to more efficiently decode video content with encoded metadata 128.

In one implementation, in order to determine which regions within each frame include pixels of substantially identical color, encoder settings 127 may include at least one of a bias and a threshold. The bias defines how similar in color pixels to the left and right of an examined pixel may be in order to be considered as a region including pixels of substantially identical color. The threshold defines which pixels, when inverted, would yield meaningful or non-meaningful data, such as regions including medium colored pixels. As such, the threshold provides instructions as to how light or how dark the color of a region must be in order to be considered as a region including pixels of substantially identical color.

Turning to client device 150 of system 100, client device 150 includes processor 152 and memory 158. Processor 152 may be configured to access memory 158 to execute decoder 160, store received input or to execute commands, processes, or programs stored in memory 158. Processor 152 may correspond to a processing device, such as a microprocessor or similar hardware processing device, or a plurality of hardware devices. Memory 158 is capable of storing commands, processes, and programs for execution by processor 152. Memory 158 may be instituted as ROM, RAM, flash memory, or any sufficient memory capable of storing a set of commands. In other implementations, memory 158 may correspond to a plurality memory types or modules. Client device 150 may be a cellular phone, a computer, a tablet computer, an optical player, or any device capable of playing back a video content.

Also illustrated in FIG. 1, client device 150 includes communication interface 156. Client device 150 may utilize communication interface 156 to communicate with communication interface 114 of server 110 over network 130. Communication interface 156 can utilize, as examples, one or more of Ethernet, Wireless Fidelity (Wi-Fi), Worldwide Interoperability for Microwave Access (WiMax), ZigBee, Bluetooth, RFID, Algorithm Division Multiple Access (CDMA), Evolution-Data Optimized (EV-DO), Global System for Mobile Communications (GSM), Long Term Evolution (LTE), and other types of wired and wireless interfaces.

Input interface 154 of client device 150 is configured to communicate with input device 172 and display 170. Input interface 154 may communicate with input device 172 and display 170 by a wired and/or a wireless connection. Processor 152 of client device 150 is configured to control input interface 154 to communicate with input device 172 and display 170. Input interface 154 can utilize, for example, Wi-Fi, WiMax, ZigBee, Bluetooth, Bluetooth low energy, GSM, LTE, and other types of wired and wireless technologies to communicate with input device 172 and display 170.

Input device 172 of system 100 may include any devices necessary for interacting with client device 150 and/or display 170. For example, input device 172 may include a keyboard, a microphone, a mouse, a headset, a display, a remote, or any other device. In the present implementation, input device 172 is connected externally to client device 150. However, in some implementations, input device 172 may be built into client device 150, such as if client device 150 is a cellular phone, for example.

Display 170 is configured to display a video content or an image. Display 170 may communicate with client device 150 through input interface 154. Display 170 may comprise a liquid crystal display ("LCD"), a light-emitting diode ("LED"), an organic light-emitting diode ("OLED"), or another suitable display screen that performs a physical transformation of signals to light. In the present implementation, display 170 is connected externally to client device 150. However, in other implementations, display 160 may be built into client device 150 and be configured for touch recognition. In such an implementation, display 170 is at least one of the devices making up input device 172.

Once client device 150 receives video content with encoded metadata 128 using communication interface 156 from server 110 via network 130, processor 152 stores video content with encoded metadata 128 in memory 158. Client device 150 is configured to determine the selected region or regions of one or more frames of video content with encoded metadata 128 that have been encoded using metadata 125, and decoded the selected region or regions to obtain metadata 125. In some implementations, client device 150 may playback video content with encoded metadata 128 without re-inverting the altered pixels to place them in the original state, i.e. the state before encoding by encoder 126 of server 110. In such an implementation, the frames including the embedded metadata 118c including inverted pixels are displayed during playback. Because the amount of inverted pixels may be minimal and may be in one or a few frames, viewers may not notice the inverted pixels. Also, because the inverted pixels may be included in regions of substantially similarly colored pixels and non-focal point regions of the frames, viewers may not notice the inverted pixels. In other implementations, however, decoder 160 may re-invert the altered pixels of video content with encoded metadata 128 to create video content 123, i.e. the original video content, and client device 150 plays back video content 123.

In some implementations, metadata 125 may only be embedded into ten frames of thousands of frames. In such an example, the embedded metadata 125 may only constitute a 10×10 matrix of pixels in each of the ten frames, where only a portion of the pixels in the 10×10 matrix are inverted, according to metadata 125. Further, each 10×10 matrix may be in a substantially black region of each of the ten frames, where the substantially black region is in the bottom right corner of each of the ten frames (e.g., FIG. 3A for further illustration.) As such, in such an example, during playback of video content with encoded metadata 128, the user may never recognize alterations to the 10×10 matrices within the ten frames of encoded content 116b.

As discussed above, decoder 160 is configured to decode video content with encoded metadata 128 to obtain metadata 118d and may create video content 123. Decoder 160 is further configured to determine how many frames and which frames of video content with encoded metadata 128 include metadata 125.

In some implementations, in order to determine which frames of video content with encoded metadata 128 include metadata 125, decoder 160 utilizes an algorithm to search for inverted pixels within frames of video content with encoded metadata 128, detect regions that include metadata 125, obtain metadata 125, and then invert the inverted pixels back to their original state to create video content 123. Decoder 160 may use an algorithm similar to a Bayer Interpolation, similar to that of cameras.

In one implementation, the decoder algorithm examines each pixel by comparing such pixel to the pixel to the left and the pixel to the right. The decoder algorithm then inverts the pixels to the left and to the right of the examined pixel and if the resulting color is similar to the examined pixel, the algorithm may assume that the examined pixel is coded for metadata 125, and that the examined pixel is part of a coded matrix. In some implementations, the decoder algorithm may examine a region of pixels and detect wide variances between the examined pixel and all of those around the examined pixel, and once a determination is made that the examined pixel is different than the surrounding pixels, the examined pixel is determined to be a part of coded metadata 125.

In some implementations, decoder 160 may be aware of the location of encoded regions based on encoder settings 128 transmitted to client device 150 by server 110. In such an implementation, decoder 160 may know the frames of encoded content 116b that include metadata 125, and also the location of metadata 125 within those frames. As such, decoder 160 is configured to obtain metadata 125 for output and utilization by client device 150, and also to decode encoded content 116b to invert the inverted pixels within the frames of video content with encoded metadata 128 to create video content 123.

Once the decoder algorithm has determined the location of the embedded metadata 125 within video content with encoded metadata 128, decoder 160 is configured to obtain metadata 125 for use and output by client device 150. For example, decoder 160 determines the proper binary code, 1's and 0's, included within frames of video content with encoded metadata 128 to obtain metadata 125.

In some implementations, for example, client device 150 may utilize metadata 125 to organize, manage, and/or sort through content on client device 150, including video content 123. In another example, client device 150 may utilize metadata 125 to output information relating to video content 123 on display 170 for viewing by the user. In yet another example, client device 150 may utilize metadata 125 to output personal messages included in metadata 125, or to output authenticity information to display 170 to authenticate video content 123 as being a legal and/or valid copy of video content 123. In one example implementation, metadata 125 may not described video content 123, but metadata may be data associated with video content 123 for authentication purposes. In such an example, metadata 125 may be used to alter pixels in a frame of video content 123 to create a picture abnormality. In such an implementation, server 110 can communicate to client device 150 that at least one frame includes at least one picture abnormality and communicate the location of the at least one picture abnormality to client device 150. Client device 150 may detect and verify the picture abnormality as part of an authentication process to ensure that video content 123 is an authentic copy.

Figure 2A:
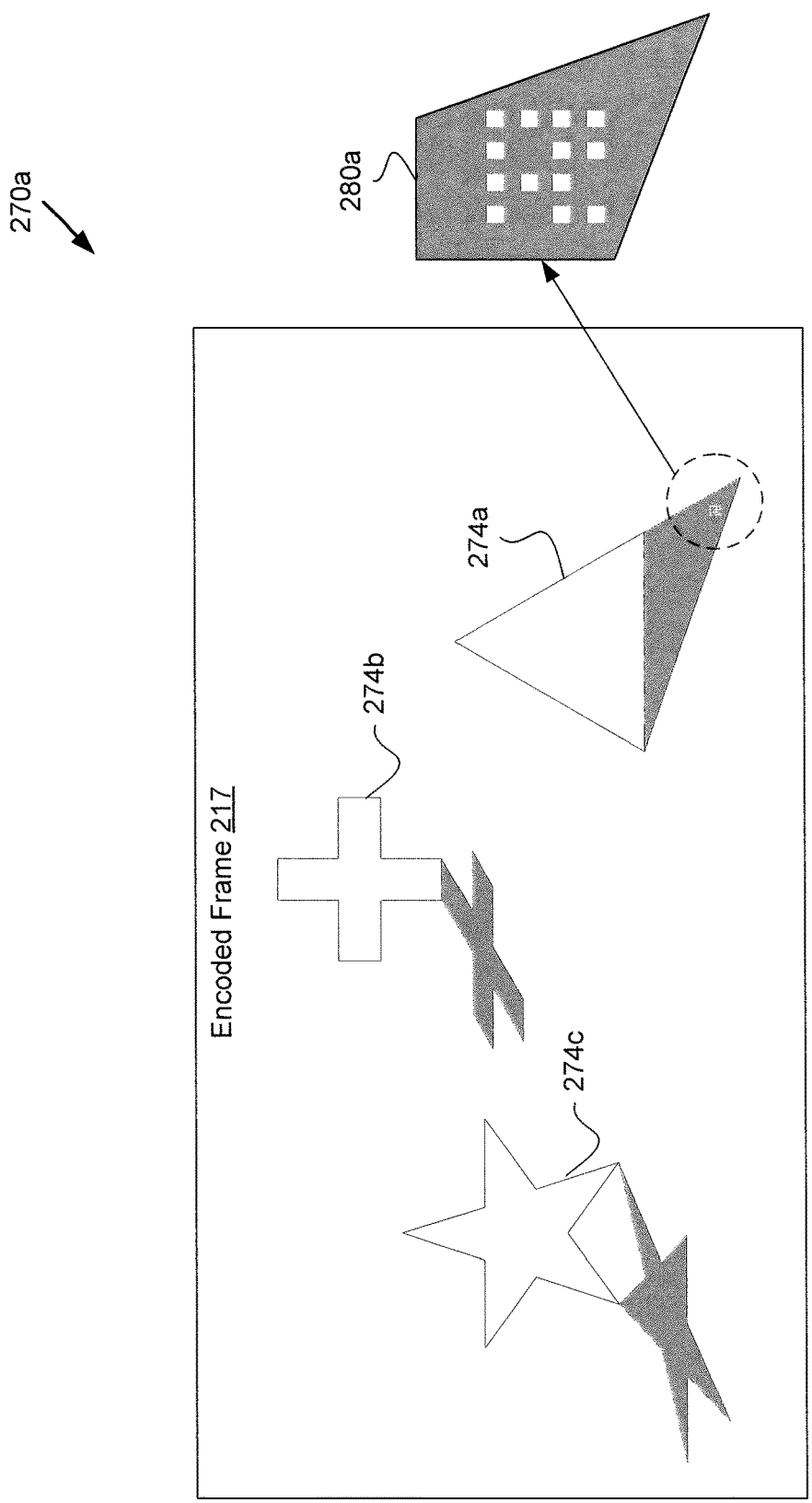
FIG. 2A presents an example of an encoded frame of a video content, according to one implementation of the present disclosure.

Referring now to FIG. 2A, FIG. 2A presents an example of an encoded frame of a video content, according to one implementation of the present disclosure. Display 270a of FIG. 2A includes encoded frame 217. Encoded frame 217 includes object 274a, object 274b, and object 274c. Object 274a includes inverted pixel region 280a. It should be noted that display 270a corresponds to display 170 of FIG. 1.

Illustrated in FIG. 2A, display 270a includes encoded frame 217. Encoded frame 217 may be one of frames embedded with metadata as discussed in FIG. 1 above. When determining where to embed the metadata, the encoder determines where a region of substantially consistent color exists in encoded frame 217, such as encoder 126 of FIG. 1. In encoded frame 217, each of object 274a, objects 274b, and object 274c include a shadow portion of consistent gray color. As such, the encoder may recognize any of the regions as a region to embed the metadata. Objects 274a includes the consistently gray color region in the bottom right corner of encoded frame 217, which may be another beneficial region to embed metadata so a viewer will not notice the inverted pixels during playback of the encoded content that includes encoded frame 217.

Also illustrated in FIG. 2A, encoded object 274a of encoded frame 217 includes inverted pixel region 280a. Inverted pixel region includes within it a 4×4 matrix, where some of the gray pixels are inverted (inverted pixels are shown in white). In some implementations, gray pixels may denote 1's and white pixels may denote 0's for embedding metadata into encoded frame 217. However, in other implementations, gray pixels may denote 0's and white pixels may denote 1's. As such, when a decoder decodes encoded frame 217, the embedded metadata can be obtained from the pixels in the 4×4 grid of encoded frame 217.

Figure 2B:
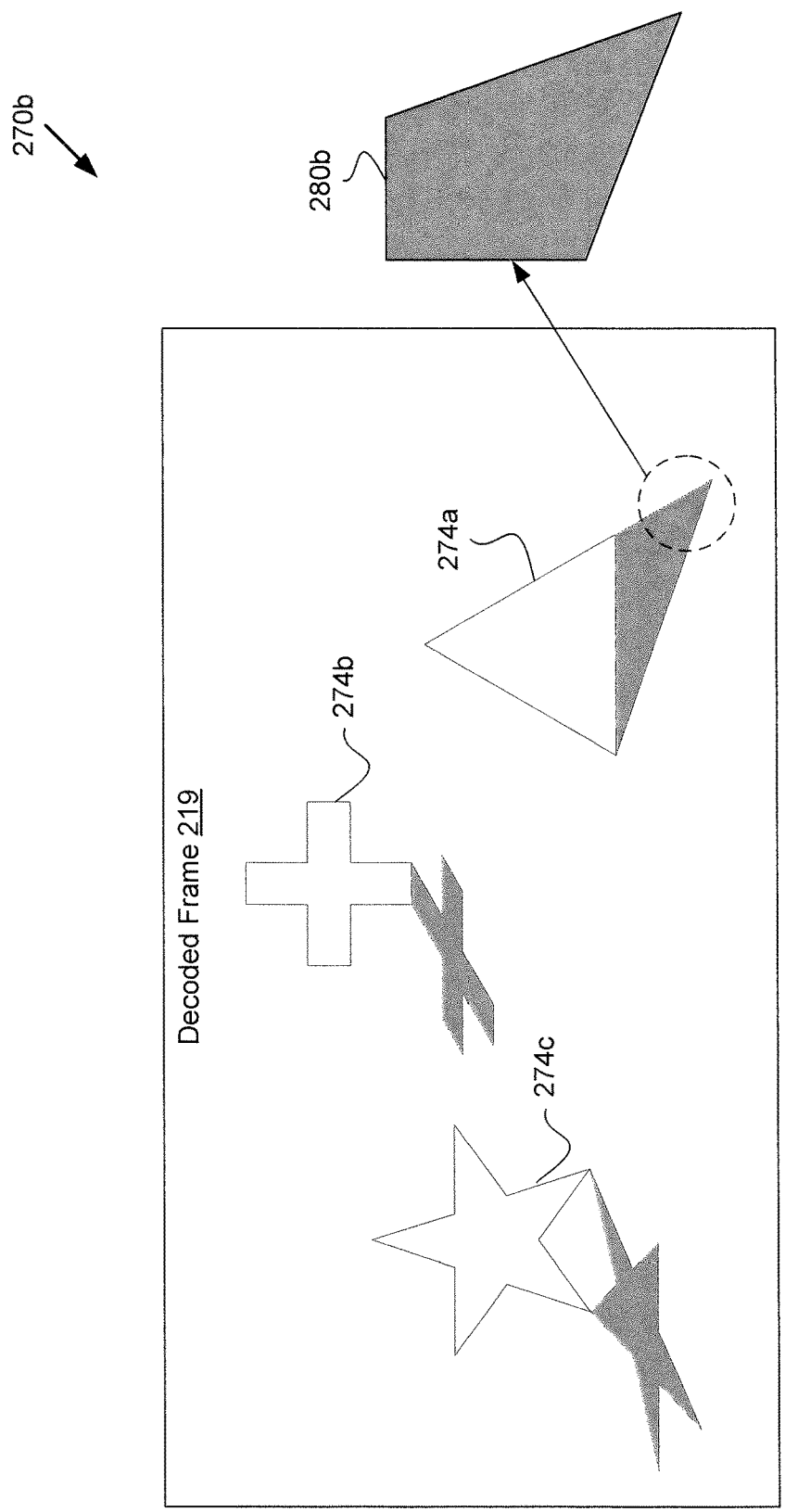
FIG. 2B presents an example of a decoded frame of a video content, according to one implementation of the present disclosure.

Referring now to FIG. 2B, FIG. 2B presents an example of a decoded frame of a video content, according to one implementation of the present disclosure. Display 270b of FIG. 2B includes decoded frame 219. Decoded frame 219 includes object 274a, object 274b, and object 274c. Object 274a includes inverted pixel region 280b. It should be noted that display 270b corresponds to display 170 of FIG. 1 and inverted pixel region 280b corresponds to inverted pixel region 280a of FIG. 2A.

Illustrated in FIG. 2B, display 270b includes decoded frame 219. Decoded frame 219 corresponds to encoded frame 217 of FIG. 2A after the decoder decodes encoded frame 217, such as decoder 160 of FIG. 1. Inverted pixel region 280b no longer includes the white pixels of inverted pixel region 280a because the decoder has inverted the inverted pixels of encoded frame 217 back to their original color. As such, decoded video frame 219, when presented on display to the user, has no noticeable inverted pixels from the previously embedded metadata.

Figure 3A:
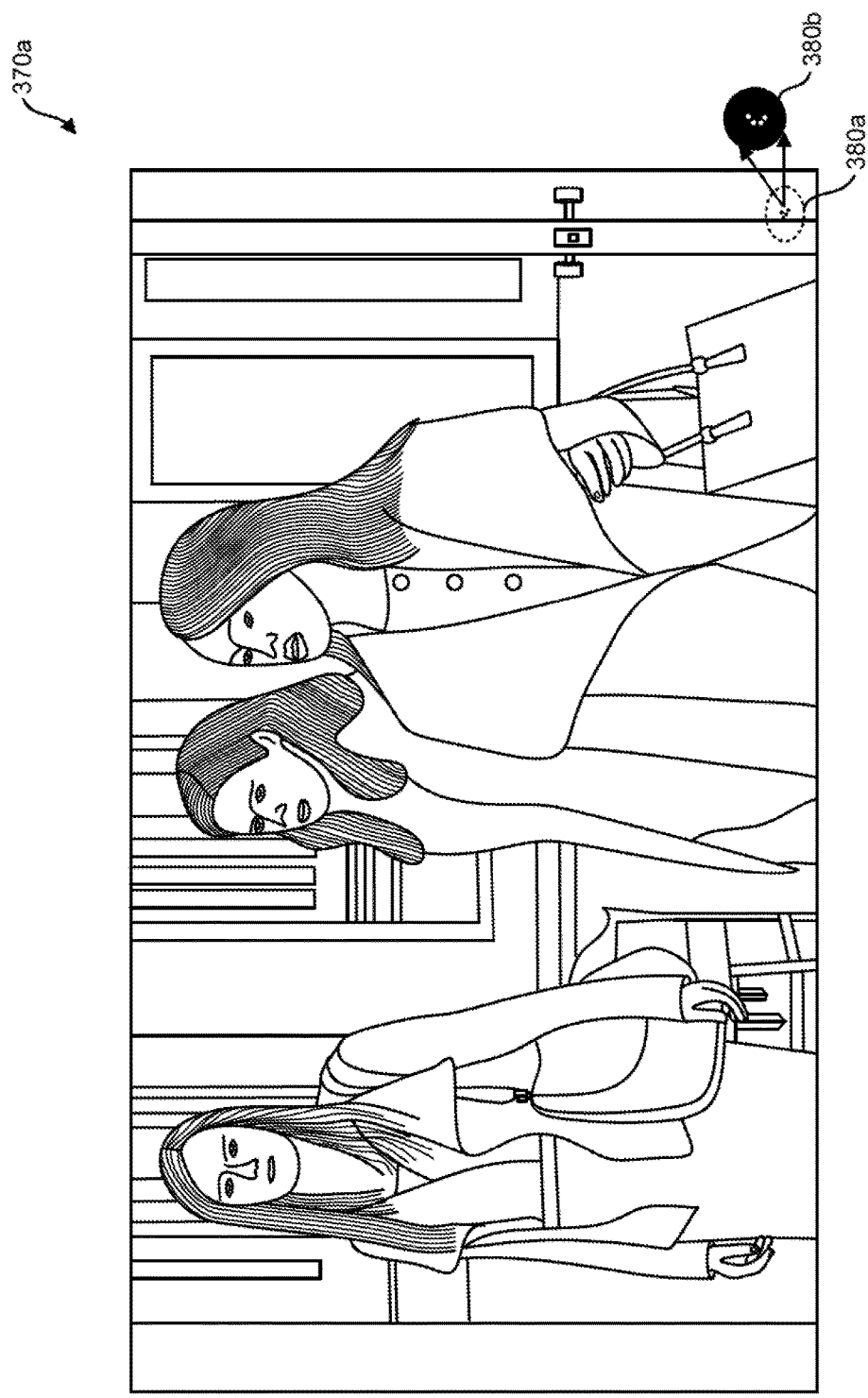
FIG. 3A presents another example of an encoded frame of a video content, according to one implementation of the present disclosure.

Referring now to FIG. 3A, FIG. 3A presents another example of an encoded frame of a video content, according to one implementation of the present disclosure. Display 370a of FIG. 3A includes inverted pixel region 380a. It should be noted that display 370a corresponds to display 170 of FIG. 1 and inverted pixel region 380a corresponds to inverted pixel region 280a of FIG. 2A.

Illustrated in FIG. 3A, inverted pixel region at the center of circle 380a (which is further enlarged in 380b) includes a matrix of inverted pixels which are barely visible in the encoded frame. Inverted pixel region is located in the shadow of the door of the encoded frame, in the bottom right hand corner region of the encoded frame, so that it is not clearly visible by the user. As such, the encoded frame could be displayed to the user on display 370a without the user likely noticing the inverted pixels of the matrix.

Figure 3B:
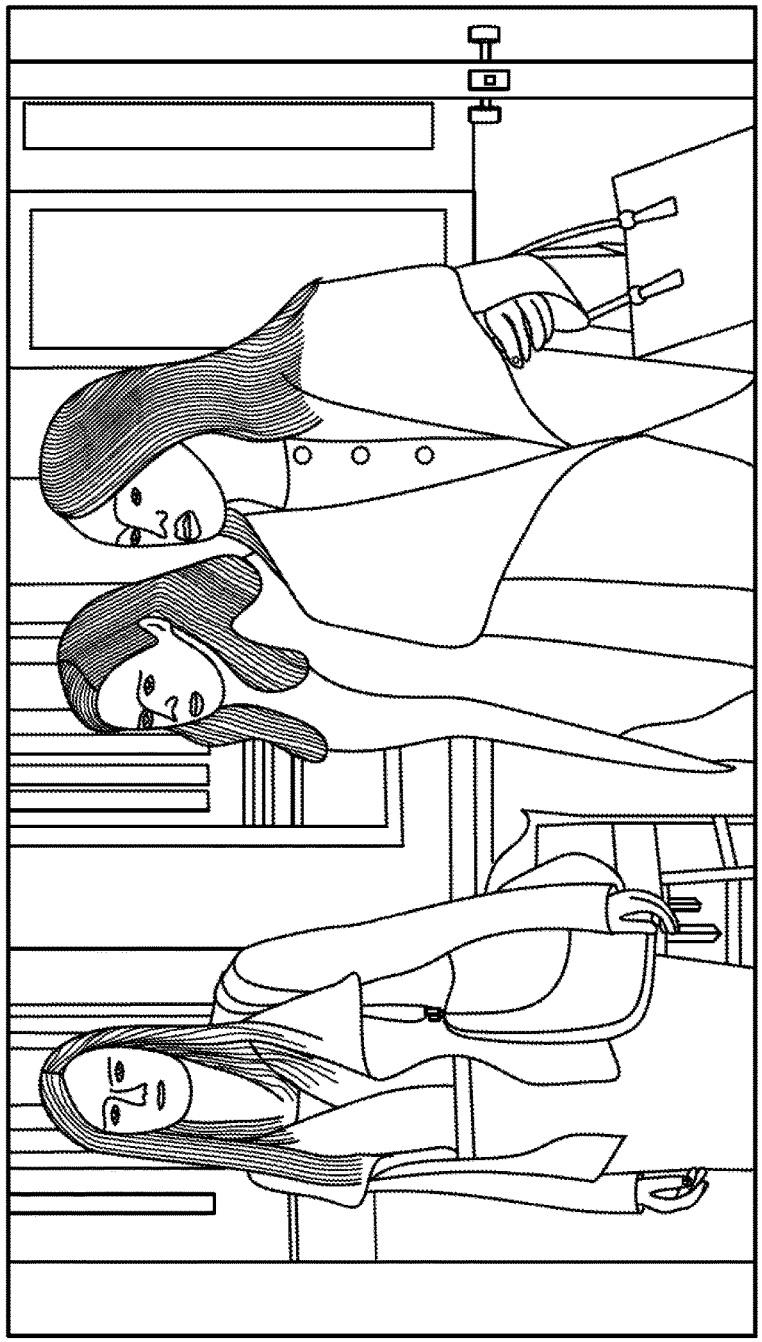
FIG. 3B presents another example of a decoded frame of a video content, according to one implementation of the present disclosure.

Referring now to FIG. 3B, FIG. 3B presents another example of a decoded frame of a video content, according to one implementation of the present disclosure. Display 370b of FIG. 3B includes inverted pixel region 380b. It should be noted that display 370b corresponds to display 170 of FIG. 1 and inverted pixel region 380b corresponds to inverted pixel region 280b of FIG. 2B.

Illustrated in FIG. 3B, inverted pixel region 380b includes the matrix of inverted pixels from the encoded frame of FIG. 3A after the decoder has inverted the pixels back to their original color, such as decoder 160 of FIG. 1. As such, the decoded frame could be displayed to the user on display 370b without any inverted pixels from the encoded frame.

Figure 4:
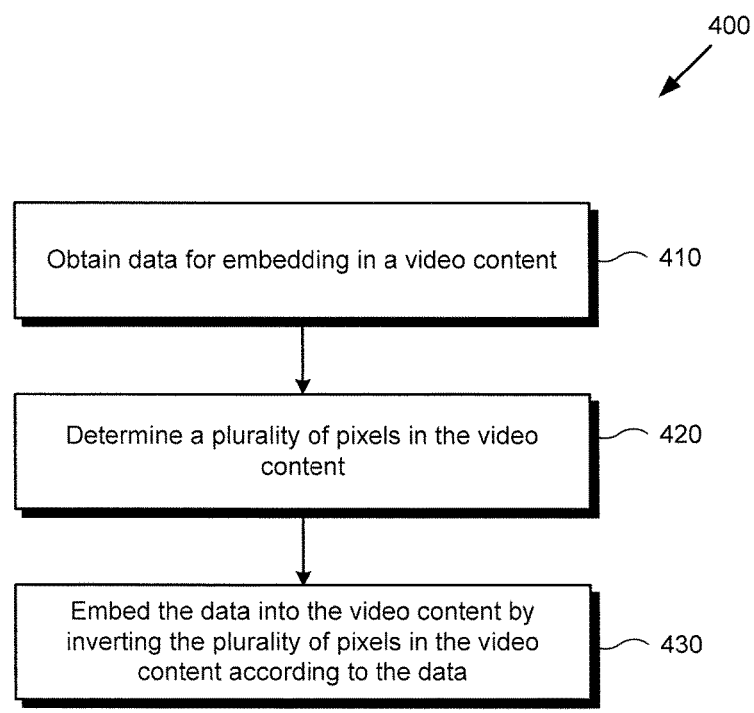
FIG. 4 shows a flowchart illustrating a method for embedding metadata into video contents, according to one implementation of the present disclosure.

Now referring to FIG. 4, FIG. 4 shows a flowchart illustrating a method for embedding metadata into video contents, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIG. 1, the disclosed concepts are not intended to be limited by specific features shown and described with respect to FIG. 1. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 (at 410) includes obtaining data for embedding in a video content. For example, encoder 126 may obtain metadata 118a for embedding into video content 123. In some implementations, encoder 126 may obtain all of metadata 125 for embedding into video content 123, or may select only a portion of metadata 125.

Referring again to flowchart 400 of FIG. 4, flowchart 400 (at 420) includes determining a plurality of pixels in video content 123. For example, encoder 126 may determine a plurality of pixels in video content 123 that are to be embedded with metadata 125. Encoder 126 may scan each frame of video content 123 to determine regions of pixels having substantially similar color, and embed metadata 125 into those regions.

Referring again to flowchart 400 of FIG. 4, flowchart 400 (at 430) includes embedding the data into the video content by inverting the plurality of pixels in the video content according to the data. For example, encoder 126 embeds metadata 125 into video content 123 to create video content with embedded metadata 128 by inverting the plurality of pixels in selected frames of video content 123 that include regions of substantially similar color.

Now referring to FIG. 5, FIG. 5 shows a flowchart illustrating a method for retrieving metadata from video contents, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 1, the disclosed concepts are not intended to be limited by specific features shown and described with respect to FIG. 1. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 (at 510) includes determining a plurality of inverted pixels in a video content. For example, decoder 160 scans frames of video content with embedded metadata 128 to determine where metadata 125, including the plurality of inverted pixels, is located within video content with embedded metadata 128. In some implementations, decoder 160 may be aware of which frames and the location within the frames where metadata 125 is located based on decoder settings 129. However, in other implementations, decoder 160 may scan each frame of video content with embedded metadata 128 pixel by pixel to determine where metadata 125 is located, for example, using an algorithm that compares a pixel with its neighboring pixels.

Flowchart 500 (at 520) includes obtaining the data embedded into the video content according to the plurality of inverted pixels in the video content according to the data. For example, decoder 160 obtains metadata 125 from video content with embedded metadata 128 by reading the matrices of inverted pixels embedded within video content with embedded metadata 128 according to metadata 125.

Next, flowchart 500 (at 530) includes outputting the data. For example, decoder 160 outputs metadata 125 on client device 150. Outputting metadata 125 includes utilizing metadata 125 to manage, organize, and/or categorize video content 123 on client device 150 and/or displaying metadata 125 on display 170.

Referring now to flowchart 500 of FIG. 5, flowchart 500 (at 540) includes inverting the plurality of inverted pixels in the video content after obtaining the data. For example, decoder 160 inverts the plurality of inverted pixels within video content with embedded metadata 128 after obtaining metadata 125 from video content with embedded metadata 128 to create video content 123. By inverting the plurality of inverted pixels in video content with embedded metadata 128, the plurality of inverted pixels are inverted back to their original color.

Flowchart 500 (at 550) also includes displaying the video content without or with inverting the plurality of inverted pixels. For example, client device 150 displays video content with embedded metadata 128 or video content 123 on display 170.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for embedding data in a video content, the system comprising:
   an encoder;
   a memory storing the encoder and encoder setting; and
   a hardware processor configured to execute the encoder according to the encoder settings to:
      obtain the data;
      determine a plurality of pixels of an image in at least one frame of the video content;
      embed the data into the image in the at least one frame of the video content by inverting the plurality of pixels according to the data; and
      provide, to a decoder, a location of the inverted pixels of the image in the at least one frame of the video content, so as to enable the decoder to obtain the embedded data from the video content.

2. The system of claim 1, wherein the plurality of pixels include pixels selected from a square grid of pixels.

3. The system of claim 1, wherein prior to embedding the data, the hardware processor is further configured to execute the encoder from the memory to:
   determine a number of frames of the video content required to embed the data.

4. The system of claim 1, wherein the determining the plurality of pixels includes:
   scanning each frame of the video content to determine at least one region of at least one frame having pixels of consistent color, wherein the plurality of pixels are in the at least one region of the at least one frame having pixels of consistent color.

5. The system of claim 1, wherein the embedded data provides authentication information to ensure the video content is an authentic copy.

6. The system of claim 1, wherein after embedding the data into the at least one frame of the video content, the video content is transmitted across a content delivery network.

7. The system of claim 1, wherein the data includes at least one of a genre of the video content and a cast list of the video content.

8. A method for embedding data in a video content, the method comprising:
    obtaining the data;
    determining a plurality of pixels of an image in at least one frame of the video content;
    embedding the data into the image in the at least one frame of the video content by inverting the plurality of pixels according to the data; and
    providing, to a decoder, a location of the inverted pixels of the image in the at least one frame of the video content, so as to enable the decoder to obtain the embedded data from the video content.

9. The method of claim 8, wherein the plurality of pixels include a square matrix of pixels.

10. The method of claim 8, wherein prior to embedding the data the method further comprises:
    determining a number of frames of the video content required to embed the data.

11. The method of claim 8, wherein the determining of the plurality of pixels includes:
    scanning each frame of the video content to determine at least one region of at least one frame having pixels of consistent color, wherein the plurality of pixels are in the at least one region of the at least one frame having pixels of consistent color.

12. The method of claim 8, wherein the embedded data provides authentication information to ensure the video content is an authentic copy.

13. The method of claim 8, wherein after embedding the data into the at least one frame of the video content is transmitted across a content delivery network.

14. The method of claim 8, wherein the data includes at least one of a genre of the video content and a cast list of the video content.

15. A system for retrieving data embedded into a video content, the system comprising:
    a decoder;
    a memory storing the decoder; and
    a hardware processor configured to execute the decoder from the memory to:
        obtain a location of the inverted pixels of an image in at least one frame of the video content;
        determine a plurality of inverted pixels of the image from the location in the at least one frame of the video content;
        obtain the data embedded into the at least one frame of the video content according to the plurality of inverted pixels of the image in the at least one frame of the video content according to the data; and
        output the data;
        invert the plurality of inverted pixels to obtain a plurality of non-inverted pixels; and
        display the video content including the plurality of non-inverted pixels.

16. The system of claim 15, wherein the hardware processor is further configured to execute the decoder from the memory to:
    invert the plurality of inverted pixels in the at least one frame of the video content after obtaining the data; and
    display the video content after inverting the plurality of inverted pixels.

17. The system of claim 15, wherein determining the plurality of inverted pixels includes:
    executing an algorithm for searching one or more frames of the video content.

18. The system of claim 15, wherein the data includes at least one of a genre of the video content and a cast list of the video content.

19. The system of claim 15, wherein the obtaining of the data embedded into the at least one frame of the video content includes:
    extracting a binary code from the plurality of pixels; and
    converting the binary code into the data.

20. The system of claim 15, wherein the system determines whether the video content is an authentic copy based on the embedded data.

* * * * *